Aug. 23, 1955 E. J. ISBISTER 2,716,235
OBJECT DETECTING AND LOCATING SYSTEMS
Filed Nov. 5, 1943 3 Sheets-Sheet 1

FIG.1

INVENTOR
ERIC J. ISBISTER
BY Paul B. Hunter
ATTORNEY

Aug. 23, 1955     E. J. ISBISTER     2,716,235

OBJECT DETECTING AND LOCATING SYSTEMS

Filed Nov. 5, 1943     3 Sheets-Sheet 2

INVENTOR
ERIC J. ISBISTER
BY Paul B. Hunter
ATTORNEY

Aug. 23, 1955  E. J. ISBISTER  2,716,235

OBJECT DETECTING AND LOCATING SYSTEMS

Filed Nov. 5, 1943  3 Sheets-Sheet 3

FIG. 7
*OUTPUT OF ADDITION TUBES 133-134*

FIG. 8
*OUTPUT OF INVERTER 151*

FIG. 9
*OUTPUT OF CONTROL TUBES 152*

← ANGULAR DEVIATION OF TARGET →

INVENTOR
ERIC J. ISBISTER
BY
*Paul B. Hunter*
ATTORNEY

United States Patent Office 2,716,235
Patented Aug. 23, 1955

2,716,235

OBJECT DETECTING AND LOCATING SYSTEMS

Eric J. Isbister, Garden City, N. Y., assignor to Sperry Rand Corporation, a corporation of Delaware Application November 5, 1943, Serial No. 509,061

32 Claims. (Cl. 343—11)

My invention relates to microwave systems and electronic circuits and it concerns particularly object locating and detecting systems.

It is an object of my invention to provide an object detecting and locating system employing balanced beams to give the equivalent of a single narrow beam.

A further object is to avoid the necessity for dual mixers and dual channels with duplicate amplifiers for receiving the balanced beams.

Still another object of the invention is to provide an improved double pulsing system.

Another object of the invention to provide a system in which delayed pulses may be matched with undelayed pulses to enable beams to be balanced without simultaneous production of the beams.

A further object of the invention is to provide a microwave system in which beams are produced at different angles, at slightly different instances of time and balanced in a receiver to produce the effect of a balanced beam system.

A further object of my invention is to provide a microwave system having a double pulsed transmitter and a signal receiver.

An additional object of my invention is to provide an arrangement for comparing signals occurring at different instants of time.

It is also an object of my invention to provide improved methods of locating and detecting objects and to provide methods of comparing transmitted pulses and received signals occurring at different instants of time.

Other further objects and advantages will become apparent as the description proceeds.

Object locating systems are known in which a relatively narrow beam of microwave or ultra high frequency radiant energy is transmitted in a direction in which the presence of such an object is suspected, and in the event of the presence of such an object a beam is reflected therefrom to a suitable receiver. Relatively narrow beams may be produced by suitable construction of radiators with reflectors. However, it is difficult to obtain sufficiently narrow beams with small light-weight reflectors, and accordingly various arrangements have been proposed for obtaining the equivalent of a very narrow beam by means of broader beams transmitted in different directions with relatively narrow angular displacement.

In one form of apparatus, particularly useful for bombing through overcast (BTO apparatus) the effect of a narrow beam is obtained by balancing or comparing two overlapping wider beams and obtaining a line of constant intensity of the reception of the two beams.

It will be understood that either two transmitter beams may be employed with a receiver having a single reception beam or receptivity pattern, the receiver comparing the reflections from the two transmitted beams, or a single transmitted beam may be employed with a receiver having two receptivity patterns at a slight angle to each other, the receiver comparing the reflection along the two receptivity patterns. In such apparatus as heretofore proposed the receiver employs two reception channels in order to separate the reflections at the two angles, and in order to enable relative strengths thereof to be compared.

In accordance with my invention in a preferred form, I also employ the principle of balancing beams (either transmitted or reflected) displaced by a small angle. In comparing the two received signal strengths in order to obtain the line of constant intensity representing a very narrow beam, however, I avoid the use of a dual channel receiver and obtain a comparison by delay of one pulse sufficiently so that transmitted pulses at different angles and time of transmission may be compared in a receiver. In one form of the apparatus, a double pulsed transmitter is employed which radiates at two different angles and the receiver is provided with a selector which includes a delay element matching the delay between pulses in the transmitter so as to select the reflections from the two transmitted pulses and delay the first sufficiently for a comparison with the second.

A better understanding of the invention will be afforded by the following detailed description considered in connection with the accompanying drawings in which.

Like reference characters are utilized throughout the drawings to designate like parts.

In a form of BTO or bombing-through-overcast apparatus which has been proposed, an object is located by transmitting a microwave beam or lobe as narrow as practicable in apparatus carried by aircraft, and receiving the reflected energy along two reception lobes having center lines at a slight angle to each other.

It will be understood that the lobe or beam referred to is actually a polar diagram representing the intensity of the transmission or reception at various angles from the center line, the intensity being plotted as a radial length.

Figure 3:
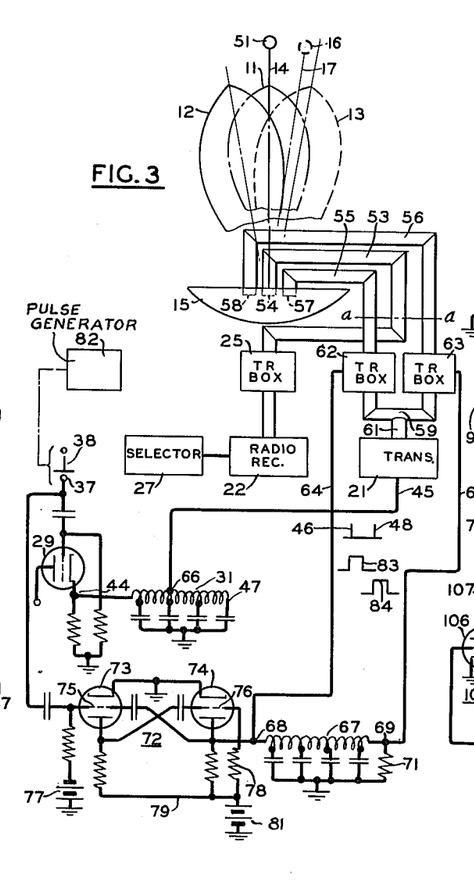
Fig. 3 is a schematic diagram of a system forming another embodiment of my invention in which the apparatus of Fig. 1 may be employed.

Lobes 11, 12 and 13 as shown in Fig. 3 may be taken as illustrative of this aspect of hitherto proposed BTO apparatus, although the apparatus of Fig. 3 is different from that heretofore known and embodies various features of my invention. If the assumed form of BTO apparatus is arranged for transmission along a single beam and reception along two beams, the transmitted beam or more properly the lobe of the polar-intensity-vs.-angle diagram 11 is centered on the line 14, and the intensity of the transmission along lines at various angles on either side of the center line 14 is represented by radial distance from a center point, (not shown) which may be within a parabolic reflector 15, to points along the lobe or curve 11. If two receiver antennas are provided, mounted off-center with respect to a transmitter antenna producing the lobe 11, there will be two receptivity patterns represented by lobes 12 and 13. In such apparatus the departure of a target 16 from the transmitter lobe center line 14 may be determined by comparing the strengths of reception of waves reflected from the object 16 along the line 17 intersecting the receptivity patterns 12 and 13. Two receiver channels may be employed for detecting signals corresponding to the lobes 12 and 13, and means may be provided for comparing the strength of the two signals.

On the other hand, if the transmission is along two radiation patterns 12 and 13, suitable means must be provided for enabling a receiver having a reception pattern 11 to distinguish between reflections produced by the two radiation patterns produced by 12 and 13. For example, the radiation along the patterns 12 and 13 may be modulated at different modulation frequencies.

In order to avoid the need for using a receiver having two radio frequency channels, or two intermediate frequency channels, or two modulation frequency channels, I utilize a pulsed transmitter producing transmission at two different angles, at two successive instances of time, and I utilize a receiver provided with a selector having a suitable delay for comparing the reflections from the two transmitted signals, or vice versa, I may employ a transmitter sending successive pulses along a given transmission radiation pattern, and I may employ a single-channel receiver receiving along two angularly displaced reception patterns at successive instants of time with a suitable selector and delay circuit for comparing the two reflected signals.

Figure 2:
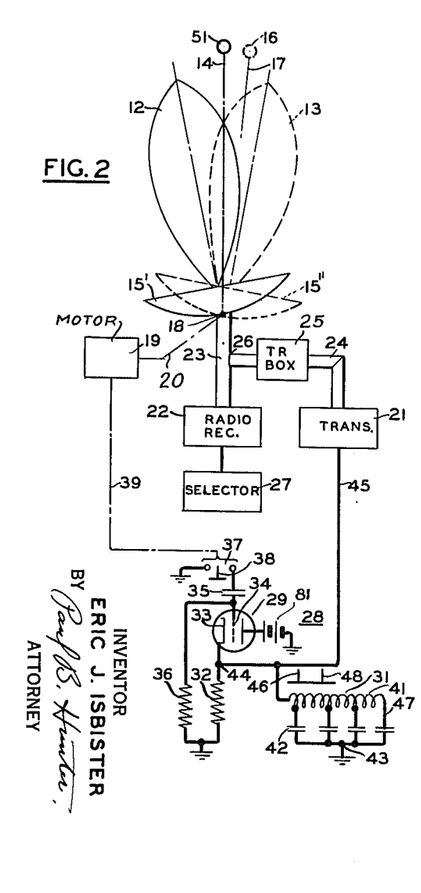
Fig. 2 is a schemmatic diagram of an object detecting and locating system forming one embodiment of my invention.

For example, in the embodiment of my invention illustrated in Fig. 2, I provide a parabolic reflector type of radiator 15' which is pivotally mounted on a pivot 18, and is provided with means for rapidly rocking the reflector 15' between one extreme position in which it is shown in full lines, and a second extreme position in which it is represented by dotted lines and designated by the numeral 15''.

Suitable means represented schematically as a reciprocating motor 19 and driving shaft 20 are provided for mechanically driving the parabolic reflector radiator 15' in its pivotal motion.

The radiator 15' may be of a conventional type including a parabolic reflector with a dipole antenna, or the mouth of a hollow pipe wave guide at the focal point thereof, and the same radiator 15' may be employed for both transmitting and receiving microwave energy as in apparatus now known.

For supplying microwave energy to the radiator 15' a transmitter 21 is provided, and for response to the reflected energy a receiver 22 is provided.

Suitable electrical connections are provided between the radiator 15' and the transmitter 21 and the receiver 22. For example, a transmission line 23 of the hollow pipe wave guide type may be provided for carrying received energy from the radiator 15' to the receiver 22, and a branch hollow pipe wave guide 24 may be provided for carrying generated energy from transmitter 21 to the wave guide 23 for emission from the radiator 15'. In order to prevent transmitted energy from travelling directly to the receiver 22, and overloading or injuring the elements thereof, a transmission-reception box 25 (T-R box) of a type heretofore known may be interposed in a portion of the transmission line connecting the receiver 22 and the junction 26 with the transmitter transmission line 24.

For enabling the receiver 22 to differentiate between pulses reflected at the instants corresponding to two different instants of transmission, a selector 27 is provided.

For causing the transmitter 21 to emit energy at the two instants of time when the radiator is at the two different angular positions represented by full-line representation 15' and dotted line representation 15'', a delay circuit 28 is provided. The delay circuit 28 is designed to supply two energizing pulses to the transmitter 21 at instants of time separated by a time interval corresponding to the time required for the radiator motor 19 to move the radiator from one extreme position to the other.

The circuit 28 may take the form, for example, of a trigger amplifier 29 of the triode vacuum tube type, for example, and a delay line 31. The trigger amplifier 29 is shown as having a cathode follower connection with a cathode resistor 32 connected between its cathode 33 and a ground connection. As shown, the tube 29 has a control electrode or grid 34 coupled through a coupling condenser 35 and grid-leak resistor 36 to a pair of input terminals 37 referred to as trigger input terminals to which a suitable trigger pulse having a wave form 38 is applied. Suitable means, not forming a part of my invention, are provided for producing the trigger pulse 38 and synchronizing it with the action of the mechanical driver 19 for rocking the antenna 15'. The synchronizing means is represented symbolically by the dotted line 39.

The delay line 31 may be constructed in accordance with principles employed in delay lines heretofore known, embodying an inductance 41 shunted at spaced points by capacities 42 to a low potential or ground connection 43.

The ungrounded, or output terminal 44 of the cathode follower tube 29 is connected to one end of the inductance 41. A connection 45 for energizing or synchronizing the transmitter 21 is provided from the terminal 44 to the transmitter 21.

The electrical dimensions of the delay line 31 must, however, be such as to provide a relatively large delay in comparison with the value of the delay ordinarily provided by delay lines in order to avoid excessive mechanical speed of the radiator 15' and the driver 19.

The selector 27 includes apparatus for introducing the same delay in the reception of the first reflected pulse as that introduced by the delay line 31 in the transmission of the second transmitted pulse so that the first transmitted pulse may be compared with the second. A suitable form of selector will be described hereinafter in connection with Fig. 1 of the drawings.

Since the characteristics of delay lines are known to those skilled in the art, the operation of the delay line 31 need not be described further than to point out that when a pulse 46 corresponding to the pulse 38 appears at the terminal 44, such a pulse will travel along the delay line 31 and upon reaching the far end 47 will be reflected back toward the terminal 44 producing a second pulse 48 after a time interval determined by the electrical characteristics of delay line 31. As shown, the line 31 is unterminated in order to produce reflections.

It will be understood that when the radiator is in a position designated by full lines 15', its transmission pattern will be that represented by the lobe 12 and when the radiator is in a position represented by dotted lines 15'' the transmission pattern will be in a position represented by the lobe 13. If a target 51 should be present along the center line 14 of the apparatus, the reception will be of equal intensity for both the reflection of the energy transmitted along the lobe 12 and that transmitted along the lobe 13.

Owing to mechanical limitations on the pivoting speed of the radiator 15′, the motion thereof during the time required for a wave to travel from the radiator 15′ to the target 51 and reflect back to the radiator 15′ will be negligible and for practical purposes the radiator 15′ may be assumed to receive with a receptivity pattern identical in angular position with the radiation pattern. So long as the target 51 remains in a position along the center line 14, two signals corresponding to the reflections of energy from the lobes 12 and 13 will be equal, and an indication will be provided in selector 27 showing the fact that the target 51 is in a center position. However, if the target should move through an angle ($\alpha$), or if the aircraft carrying the detector apparatus should move through such an angle, so that target 51 appears in a position 16 with respect to the apparatus, a stronger signal will be received when the energy from the lobe 13 is reflected than when the energy from the lobe 12 is reflected. The selector 27 will provide a suitable indication of the unbalance showing that the target is off center.

Figure 4:
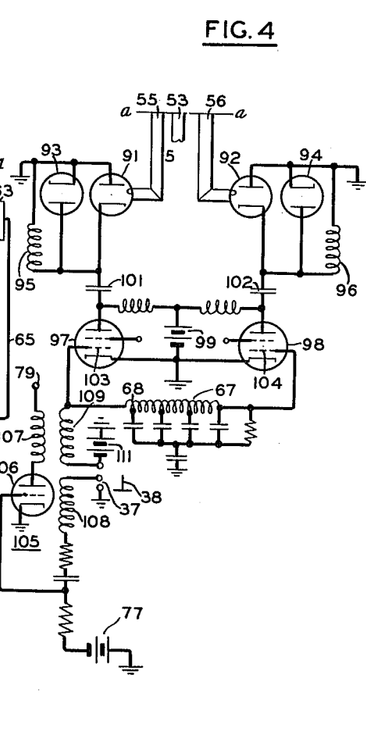
Fig. 4 is a fragmentary circuit diagram of an object detecting and locating system forming another embodiment of my invention.

In order to simplify the mechanical arrangement, avoiding the necessity of mechanical driver 19, and permit the use of a delay line having a shorter time constant than required in apparatus of Fig. 2, I may provide separate antennae or I may provide transmission lines for causing microwave energy to be applied at two different points in a fixed radiator 15 so as to produce the angularly displaced transmission patterns 12 and 13, as shown in Fig. 3. For directing transmission to different points I may either utilize a single transmitter with valves or traps for directing the energy through different output lines at different instants as shown in Fig. 3, or I may provide separate transmitters as shown in Fig. 4.

Referring first to Fig. 3, the apparatus illustrated therein comprises the conventional parabolic radiator 15, together with the transmitter 21, receiver 22, selector 27 and suitable transmission lines.

In this case an independent transmission line shown in the form of a hollow pipe wave guide 53 is provided for the receiver 22. The wave guide 53 may have a mouth 54 along the axis of the parabolic radiator 15 substantially at the focal point thereof for receiving energy reflected from the target 51 or 16 and reflected again by the parabola reflector 15.

Figures 5, 6, 7, 8, 9, 10, 11, 12, 13:
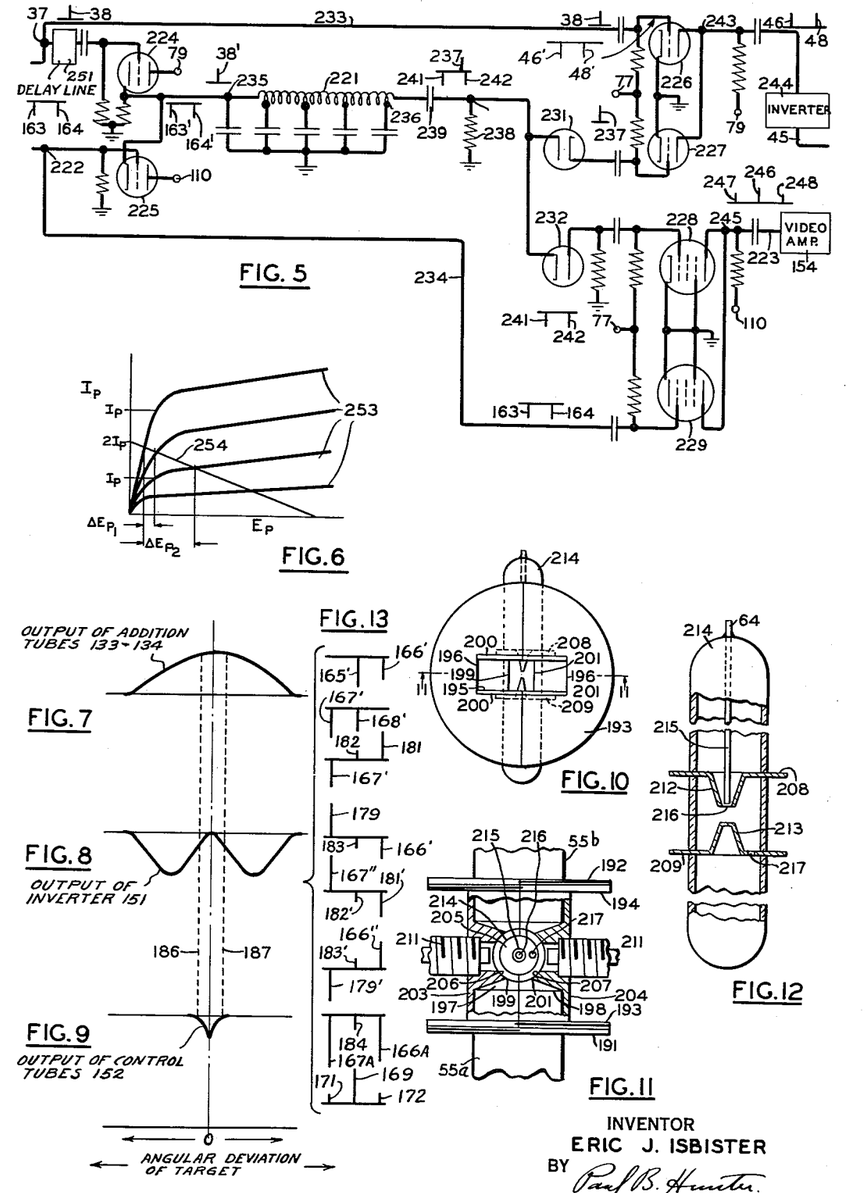
Fig. 5 is a fragmentary circuit diagram of a modified timing arrangement which may be employed in connection with apparatus such as that in Fig. 3, by which a single delay line may be employed for producing a requisite delay between the transmitted pulses and between the received signals.
Fig. 6 is a graph illustrating the characteristics of a vacuum tube which may be employed in the selector of Fig. 1.
Figs. 7, 8, and 9 are a set of graphs illustrating the relationship between beam angle and received signals at various points in the circuit of Fig. 1.
Fig. 10 is an elevation view of a T-R box or transmission reception unit which may be employed in the transmitter output lines of the apparatus of Fig. 3.
Fig. 11 is a plan view of the apparatus of Fig. 10, partially in section as cut by the plane 11—11 of Fig. 10, together with fragmentary representation of wave guide connections thereto.
Fig. 12 is an enlarged detailed view of the gap containing tube forming a part of the apparatus of Figs. 10 and 11.
Fig. 13 is a set of graphs explanatory of the principle of operation of the apparatus of Fig. 1.

Two separate transmission lines 55 and 56 are provided for the transmitter 21. The transmission lines 55 and 56 have mouths 57 and 58, respectively, displaced to either side of the center or axis of the parabolic radiator 15. The transmission lines 55 and 56 are connected through a T 59, to a trunk line 61 coming from the transmitter 21. Suitable means for permitting energy to pass only through one or the other of the transmission lines 55 and 56 at a given time are provided. For example, transmission-reception boxes 62 and 63 of a special type may be provided. These transmission-reception boxes include tripping anodes connected to tripping connections 64 and 65, respectively. A suitable form of pulsed transmission-reception (T–R) box is illustrated in Figs. 10, 11 and 12, and will be described in greater detail hereinafter.

As in the case of the apparatus of Fig. 2, a delay line is provided for double pulsing the transmitter 21. In this case, however, the tripping connection 45 of the transmitter 21 is not connected to the end terminal 44 of the delay line 31, but to an intermediate terminal 66 which may be near the left end terminal 44.

As will be described in greater detail hereinafter, the connection 45 is taken from the intermediate point 66 in order to provide a slight delay in the initial pulse of the transmitter 21 in order to give the pulsed transmission reception boxes 62 and 63 time to become operative.

For the purpose of supplying two trigger signals displaced in time of occurrence to the tripping connections 64 and 65 of the T–R boxes 62 and 63, a second delay line 67 is provided and the conductors 64 and 65 are connected to the end terminals 68 and 69, respectively, of the delay line 67. The output terminal 69 has a resistance termination 71 of the proper resistance, viz. equalling the characteristic impedance of the line 67, connected thereto in order to prevent reflections from the end 69 of the line. In order to maintain tripping voltage on the pulsing conductors 64 and 65, for adequate periods of time to insure the passage of transmitted energy through the T–R boxes 62 and 63 respectively, a square pulser or short gate former 72 is interposed between the trigger terminals 37 and the input terminal 68 of the delay line 67. Since the pulses supplied to the delay line 67 traverse the line only once and are not reflected back to the input end of the line, the delay line 67 should be designed for substantially twice the time constant of the portion of the delay line 31 between the terminals 66 and 47.

The device 72 may take the form of a multi-vibrator circuit and may be of the conventional single pulse multi-vibrator type. In the form illustrated, the multi-vibrator 72 comprises a pair of triodes 73 and 74, one of which has a negatively biased control electrode 75 capacitively coupled to the master trigger terminals 37, the other of which has a positively biased control grid 76. The negative bias for the grid 75 may be provided by a "C" battery 77 and positive bias for the control grid 76 may be provided by a high resistance or grid leak connection 78 to the positive bus 79 of a conventional power supply 81 for the tubes 73 and 74. For supplying the trigger pulses 38 to the trigger pulse terminal 37, a trigger pulse generator 82, of any suitable type, is provided.

Each time a trigger pulse 38 is produced, a pair of trigger pulses 46 and 48 is supplied to the transmitter 21 through the cathode follower 29, the delay line 31 and the conductor 45; likewise a pair of short-gate or positive square wave voltage pulses of short duration 83 and 84 is supplied to the pulsing connections 64 and 65 of the pulsed T–R boxes 62 and 63. Owing to the fact that the connection 45 is made to an intermediate terminal 66 of the delay line 31, the spike 46, corresponding to the trigger 38 occurs with a slight delay after the occurrence of the trigger 38, determined by the distance between the terminals 44 and 66 of the delay line 31. The second spike 48 is produced after a further delay, determined by the constants of the delay line 31. As indicated in the drawing, the spikes 46 and 48 are sharp voltage impulses which pass through the connection 45 for triggering the transmitter 21.

As is well known to those skilled in the art, multi-vibrator circuits may be so designed as to produce square waves or flat top pulses, with a time duration determined by the constants of the circuit. The constants of the coupling elements of the multivibrator 72 are so chosen as to produce a gate or square pulse 83 of a relatively short time duration in response to each triggering pulse 38. Since the multivibrator grid 75 is biased and the trigger pulse 38 is positive, the tube 73 is normally non-conducting and becomes conducting momentarily for a time duration determined by the multivibrator constant, when the voltage of the grid 75 is raised by the trigger 38. The pulse 83 occurs at the output terminal 68 of the multivibrator 72. After a time delay, determined by the constants of the delay line 67, a second pulse 84 of square wave form substantially identical with that of gate 83 is produced at the far end 69 of the delay line 67. Owing to the delay in the spike 46 produced by the spacing between the terminals 44 and 66 of delay line 31, the gate 83 commences before the spike 46. Consequently the T–R box 62 is in inoperative or short-circuiting condition throughout the time interval shortly before and after the occurrence of the spike 46. Likewise the gate 84 brackets the spike 48. The constants of the delay lines 31 and 67 are so chosen as to obtain the same delay between the gate 83 and 84 as between the spikes 46 and 48.

As will be described in greater detail hereinafter in connection with Figs. 10–12, the pulsed T–R boxes 62 and 63 normally allow microwave energy to pass through them, but when pulsed by one of the pulsing connections 64 and 65, the T–R box in question becomes a short circuit for microwave energy and acts as a reflector causing a microwave energy to return to the pipe T or junction 59 instead of passing through the T–R box. For example, when the T–R box 62 is pulsed it becomes a short circuit and transmitted energy from transmitter 21 passes through the T–R box 63 and transmission line 56 to its mouth 58. Likewise when the reception box 63 is pulsed, energy passes through the T–R box 62 and the transmission line 55. Thus, the first time the transmitter 21 is pulsed energy is emitted from the mouth 58, of the wave guide 56, causing radiation along the pattern 13, and the second time the transmitter 21 is pulsed energy is emitted from the mouth 57 of the wave guide 55 causing radiation of energy along the pattern 12.

The selector 27 includes a suitable delay line for delaying the energy received by reflection of the radiation of the pattern 13 so as to occur at the same instant as the reception of the reflected signal corresponding to the radiation on the pattern 12. The selector 27 also includes suitable selecting and comparison circuits so that an indication is produced of the presence of any unbalance between the signal intensity corresponding to the reflections from the radiations 12 and 13, and giving also a sense indication in order that the receiving operator can determine whether the target 16 lies on one side or the other of the center line 14 of the apparatus.

If two separate transmitters are to be employed the arrangement may be as illustrated in Fig. 4. In this case the transmitters may take the form of ultra high frequency oscillator tubes 91 and 92, such as magnetron oscillators, for example, having output connections or transmission lines in the form of wave guides 55 and 56, corresponding to the elements designated by the same reference numerals in Fig. 3.

In the apparatus of Fig. 4 a receiver and selector, of the same type arrangement as shown in Fig. 3 may be employed. The portion of the apparatus above the line a—a may also be identical with that shown in Fig. 3.

As in known magnetron operating circuits the oscillators 91 and 92 may have rectifying tubes or diodes 93 and 94, respectively, and radio frequency chokes 95 and 96, respectively, connected across them with the magnetron anodes grounded, and with means for supplying high voltage negative pulses to the magnetron cathodes. For example, a pair of triggering amplifiers 97 and 98 may be provided having a power supply 99 of relatively high voltage and capacitative couplings 101 and 102 to the cathodes of the magnetron oscillators 91 and 92 respectively. The triggering amplifiers 97 and 98 include control grids 103 and 104, connected to opposite ends of the delay line 67, which may be identical with that shown in Fig. 3. For supplying suitable triggering pulses to the control electrodes 103 and 104, a blocking oscillator 105 of a type heretofore known may be employed. As shown, the blocking oscillator 105 comprises a triode 106, a three-winding load transformer having one winding 107 in the anode circuit of the tube 106, a second winding 108 coupled in the grid circuit, and a third winding 109 in the output circuit, connected to the input terminal 68 of the delay line 67. In the arrangement illustrated a source of negative bias such as "C" battery 111 for the triggering amplifiers 97 and 98 is connected to one end of the winding 109, the other end being connected to the input terminal 68 of the delay line 67.

The grid circuit of the blocking oscillator 105 is coupled to trigger terminals 37, such as heretofore described through which a master trigger pulse 38 is supplied.

It will be apparent from an examination of Fig. 4 that the triggering amplifiers 97 and 98 become conducting in response to the trigger pulse 38, with the action of the triggering amplifier 98 delayed by an interval determined by the constants of the delay line 67. This same delay will take place in the action of the magnetron oscillators 91 and 92, thus causing radiation at two successive instants, first along the pattern 13, and then along the radiation pattern 12, as in the apparatus of Fig. 3. Reception takes place in the same manner as in the apparatus of Fig. 3.

Figure 1:
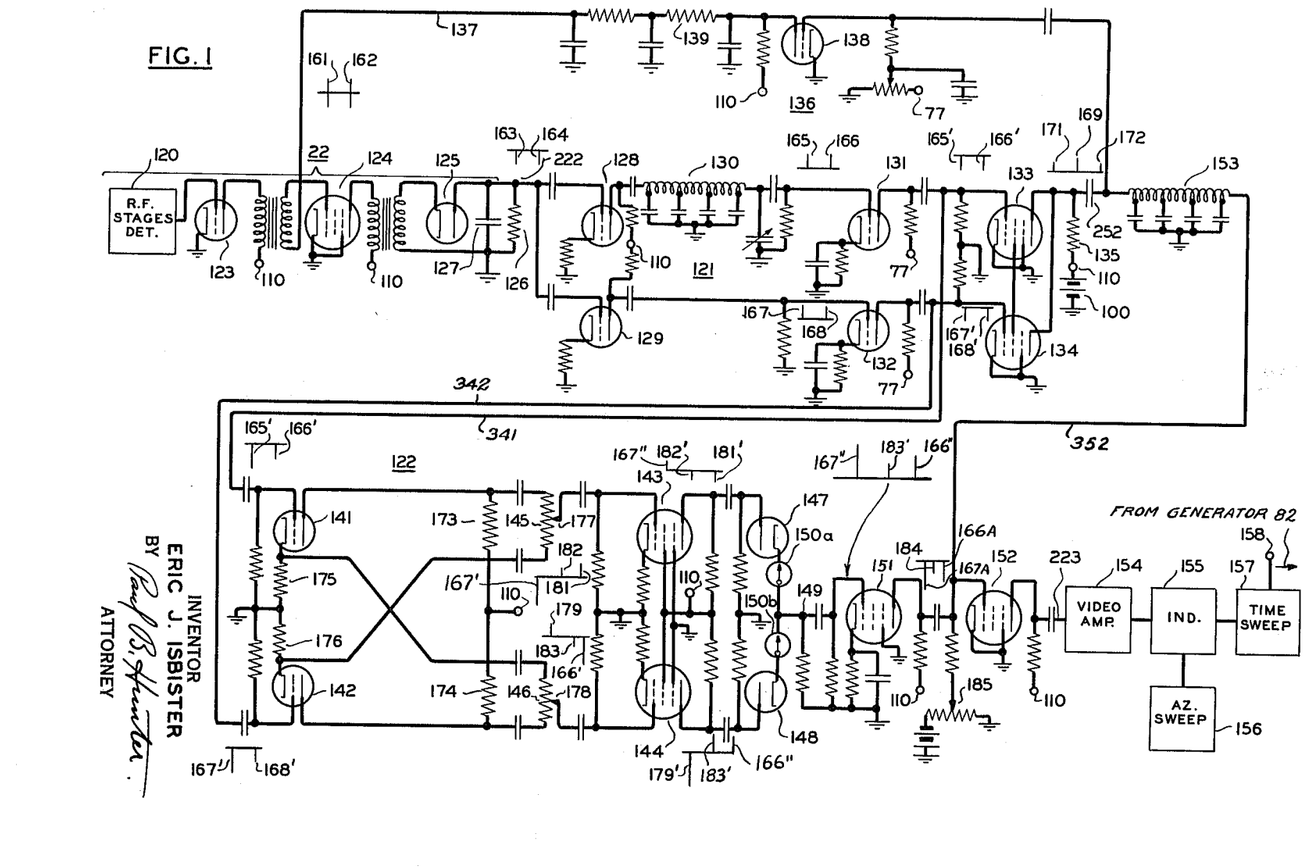
Fig. 1 is a circuit diagram of a selector together with schematic indication of other components of a receiver which constitutes one embodiment of my invention.

My invention is not limited to utilization of a particular form of selector with the receiver 22. However, satisfactory results may be obtained by utilizing a selector such as illustrated in Fig. 1. This apparatus is arranged for both determining the coincidence of received signals and balancing one received signal against the other. Although the selector forms a part of the receiving apparatus, it is shown as an auxiliary to a conventional microwave pulse receiver 22.

For convenience the receiver 22, shown in Figs. 2 and 3, is assumed to comprise the portion of a microwave pulse radio receiving system including the requisite ultra high radio frequency stages, the first detector and one or more intermediate frequency stages, and a second detector customarily employed in such apparatus. The selector 27 is assumed to include the video stages together with special apparatus for providing coincidence selecting and balancing.

In Fig. 1 the radio frequency stages, the first detector and possibly intermediate frequency stages are schematically represented by a rectangle 120.

In Fig. 1 the radio frequency stages 120 are shown as followed by a pair of intermediate frequency amplifiers 123 and 124, which are transformer coupled. For converting the intermediate frequency signal into a video signal, a conventional second detector 125 such as a diode is provided having the usual load circuit comprising a resistor 126 by-passed by a condenser 127.

The selector 27 of Figs. 1 and 2, comprises a coincidence circuit 121 and a comparison circuit 122. In the coincidence circuit 121, a pair of isolation amplifiers 128 and 129 is provided for causing the output of the second detector 125, namely the video signal, to divide and travel along two separate paths. Inverting amplifiers 131 and 132 corresponding to the isolation amplifiers 128 and 129, respectively, are provided and a coincidence delay line 130 is interposed between the isolation amplifier 128 and the inverting amplifier 131. For combining the outputs of the inverting amplifiers 131 and 132, an addition or mixer circuit is provided comprising a pair of vacuum tube amplifiers 133 and 134, having a common anode load impedance 135 connected to a positive terminal 110 of a power-supply 100. As shown, conventional capacity coupling to their respective following stages is provided for the amplifiers 128, 129, 131 and 132.

If desired, an automatic volume control circuit 136 may be coupled to the output of the addition amplifiers 133 and 134, with an AVC line 137 connected in the bias circuit of the intermediate frequency amplifier 124. As shown, the AVC circuit 136 comprises an amplifier 138, and an output filter circuit 139 together with conventional coupling elements.

The comparison circuit 122 comprises a pair of comparator tubes 141 and 142, with input connections in the form of leads 341 and 342 from the inverting amplifiers 131 and 132 respectively, of the coincidence circuit 121, a pair of amplifiers 143 and 144, a pair of differential potentiometers 145, 146 interposed in the coupling from the pair of comparator tubes 141, 142, to the amplifiers 143, 144, and a pair of polarity selectors 147, 148. The latter have a common output terminal 149, followed by an inverting amplifier 151 and a control tube 152. No sense indication as such is required since as will be explained hereinafter, an indicator 155 gives angular indication in azimuth. However, if desired for other types of systems, sense indicators or sense-responsive control elements may be provided. For example, current-responsive device 150a and 150b may be inserted in series with the polarity selectors 147, and 148, respectively.

A compensating delay line 153 is interposed between the output of the addition tubes 133 and 134 and lead 352 forming the input to the control tube 152. The control tube 152 is provided with a bias circuit supplied by the output of the inverter 151.

The control tube 152 is followed by a conventional video amplifier 154 schematically represented and as in conventional video apparatus the video amplifier 154 may be utilized for energizing the cathode ray beam of a conventional cathode ray indicator 155, having an azimuth sweep circuit 156 and a time sweep circuit 157 with a synchronizing connection 158 to the master trigger generator 82 of Fig. 3.

As in BTO apparatus heretofore proposed, suitable means (not separately shown) may be provided for sweeping the radiator 15 of Fig. 3 in azimuth to track a target and the box 156 shown in Fig. 1, is assumed to include both a suitable triangular wave generator for sweeping the cathode ray beam of the indicator 155 and the mechanism for sweeping the radiator 15 of Fig. 3 synchronously with the azimuth sweep voltage indicator 155.

It will be understood that the time sweep voltage supplied by the time sweep generator 157 is also preferably substantially triangular in wave shape.

The principle of operation of the selector circuits of Fig. 1 will become apparent by tracing the passage of the signals to the various circuits from the radio receiver 22 to the video amplifier 154. Whenever the transmitter 21 of Fig. 3, or transmitters 91 and 92 of Fig. 4 are tripped in response to the master trigger generator 82, of Fig. 3, and the time sweep 157, of Fig. 1, is initiated, pulses are radiated from the radiator 15 (Fig. 3) which produce reflected signals picked up by the receiver 22. As explained in connection with Fig. 3, two reflected signals are received because the transmitter or transmitters are double-pulsed. This is represented in Fig. 1 by the wave form shown above the immediate frequency amplifier 124, consisting of two pulses 161 and 162, separated by a time delay and each indicated as being both positive and negative. Actually the pulses, 161 and 162 each consist of a wave train of ultra high frequency oscillations, but they are shown as narrow vertical lines owing to the fact that time duration of each such wave train is very short in comparison with the time delay between wave trains. When the pulses 161 and 162 are passed through the second detector 125, only the modulation envelopes of one polarity appear in the output of the second detector. Thus, the pulses 161 and 162 are converted into two video signals 163 and 164, shown as negative by reason of the manner in which the second detector has been connected. As these signals pass through the isolation amplifiers 128 and 129, they are inverted. Those passing the amplifier 128 appear as a pair of pulses 165 and 166, each delayed by the time constant of the delay circuit 130, and the pulses passed by the amplifier 129 appear as a pair of pulses 167 and 168, which are undelayed as they pass directly from the isolation amplifier 129 to the inverting amplifier 132. The pulses 165 to 168 are inverted again by the inverting amplifiers 131 and 132, retaining their previous time relationship and are accordingly designated by the primed numerals 165' to 168'.

The constants of the delay line 130 are so chosen as to correspond with the delay lines 31 and 67, utilized in the transmitter of Fig. 3, or such delay lines as may be used in other types of double pulsed transmitters so that the first pulse 165 of the delayed pair occurs at the same time as the second pulse 168 of the pair which has not been delayed by the delay line 130. Likewise the inverted pulses 165' and 168', coincide in time of occurrence. The output of the addition amplifiers 133 and 134, ordinarily consists of a large pulse 169 corresponding to the sum of the pulses 165' and 168', and two smaller pulses 171 and 172, corresponding to the pulses 167' and 166' respectively.

If desired the amplifiers 133 and 134 may be operated with relatively large bias so as to act as linear addition circuits in which case the pulse 169 will have double the amplitude of pulses 171 and 172. However, satisfactory operation will also be obtained if the bias is reduced so that non-linear operation is obtained and the amplitude of pulses 171 and 172 is negligible in contrast to the amplitude of the pulse 169. Particularly in connection with the latter type of operation the automatic volume control circuit 136 is useful in that it maintains the amplification of the intermediate frequency amplifier 124 at a suitable level for maintaining the addition signal 169 substantially constant in amplitude regardless of the operating conditions. Since noise and other random signals seldom have the right period, they are discriminated against.

Fig. 6 is a graph illustrating the relationship between the anode current measured in a vertical direction and anode voltage measured in a horizontal direction in a vacuum tube which has suitable tube characteristics to be used as one of the addition tubes 133 and 134. It will be understood that the separate curves 253 represent the characteristics at different values of control grid voltage and that the straight line 254 is a load curve indicating by its intercepts with the characteristics curves 253 the values of anode current (and therefore the output voltage) obtained with various values of input or control grid voltage. This graph demonstrates the fact that linear operation may be obtained by biasing the tube sufficiently to cause operation in the lower current regions of the graph.

The pulses 165' to 168' appear also at the inputs of the comparator tubes 141 and 142. These tubes are provided with both anode load impedances or resistors 173, 174, respectively, and cathode load impedances or resistors 175 and 176, respectively. The potentiometers 145 and 146 are coupled between the anode of one comparator tube and the cathode of the other and are provided with adjustable taps 177 and 178, so that the anode and cathode output voltages may be equalized and the voltage on each tap represents the difference between the inputs to the comparator tubes 141 and 142. The potentiometers 145 and 146 are so connected that the taps 177 and 178 give voltage outputs of opposite polarities. Since the pulses 165' and 168' coincide they will tend to balance each other in the outputs of the difference potentiometers 145 and 146. However, a full-strength pulse 179 will be produced at the instant of time corresponding to the pulse 167', and a full strength pulse 181 will also be produced at the instant of time corresponding to the pulse 166', both of these pulses, 179, 181 being positive due to the inverting action of the tubes 141, 142. The pulses 167' and 166' will reappear with unchanged polarity at the potentiometer taps 177 and 178 owing to the cathode follower action of the tubes 142 and 141, respectively. The presence of the pulses 167' and 166' has no effect on the video indication, as will become apparent hereinafter. At the instants of time corresponding to the coinciding pulses 165' and 168', however, pulses 182 and 183 of same magnitude but of opposite polarity will be produced at the potentiometer taps 177 and 178 unless the pulses 165' and 168' are equal in magnitude. As represented by the presence of the pulses 182 and 183 it is assumed that these coinciding pulses are not equal in magnitude. The magnitude of the pulses 182 and 183 represents the difference in magnitude between the pulses 165' and 168', which occur at the same instant. The time relationships and assumed relative magnitudes of the various pulses are shown in Fig. 13.

Upon amplification by the amplifiers 143 and 144, the pulses 179 and 181, 182, 183, will be produced in inverted form and increased magnitude as representd by the primed reference numerals 179' to 183'. Upon passing through the polarity-selecting rectifiers 147 and 148, the negative pulses are eliminated and only one of the coincidence difference pulses, in this case the difference pulse 183', passes through. This pulse is reinverted and amplified by the inverter 151 to produce a relatively large negative pulse 184 supplying a negative bias to the control tube 152 whenever there is any unbalance between the magnitudes of the pulses 165' and 168'. Since these pulses were originally produced by the pulses 161 and 162, in the radio receiver 22, the control tube 152 is biased beyond cut-off whenever there is any unbalance between the pulses received as a result of energy reflected after transmission of pulses along beams 12 and 13 of Fig. 3. The pulse 169 appearing across the load resistor 135 of the amplifiers 133 and 134, can pass through the control tube 152 only when there is exact balancing of the two reflected signals corresponding to the double pulsing of the transmitter. The pulses 171 and 172 are ordinarily relatively small and in any event do not pass because the tube 152 is biased to cut-off at the times of occurrence of the pulses 171 and 172 by large negative pulses 167A and 166A, corresponding to the pulses 167" and 166". Accordingly, the video amplifier 154 is energized only when the pulses are balanced, and an indicating spot is produced on the screen of the cathode ray indicator 155 only when the apparatus is so aligned that the target 51 (Fig. 3) is being exactly tracked with the center line 14 of the radiator 15 of the target 51.

The compensation delay line 153 compensates for the difference in delay occurring in the circuit of the tube 133 and in the multistage circuits 122, 143, 147 and 151.

As in BTO apparatus, heretofore proposed, the angular position of the target is indicated by the position of the cathode ray indicator spot produced by the azimuth sweep 156, and the range of the target is determined by the time delay required for the reflected pulse to be received and is indicated by the vertical position of the cathode ray indicator spots determined by the vertical sweep voltage from the time sweep generator 157.

If the apparatus is to be used for automatic tracking or in some other system not utilizing the indicator 155, the sense indicators 150a and 150b will indicate whether the target is to the right or to the left of a reference point, one or the other of the indicators 150a and 150b being energized by the pulse 183' or a pulse which is the inverse of the pulse 182' except when the reference point is on the target.

Fig. 7 represents the variation of the magnitude of the output of the addition tubes 133 and 134 with angular deviation of the target from the center line of the apparatus. In Fig. 7 the signal amplitude is measured vertically and the angular deviation is measured horizontally.

Fig. 8 represents the variation in magnitude of the bias supplied to the control tube 152 by the inverter 151 with variation in the angular deviation. It will be observed that when the target is being exactly tracked the center line 14 of the scanner 14 is directed toward the target so that the two signals are exactly balanced, zero bias is provided the control tube 152, and a signal is permitted to pass through the control tube 152. However, when the target lies on either side of the center line 14, so that it is not being properly tracked, relatively large bias occurs and cuts off the control tube 152. Thus, as illustrated in Fig. 9, a signal is passed through the control tube 152 to the video amplifier 154 only when the target lies within a relatively narrow angle represented by the lines 186 and 187, thus giving the equivalent of a very narrow angle of a transmitted beam. If desired, the control tube 152 may be provided with an adjustable reference bias source 185 in the form of a potentiometer and C-battery for enabling the apparent beam width to be adjusted.

Although my invention is not limited to the use of a particular form of pulsed T-R boxes 62 or 63 as indicated schematically in Fig. 3, satisfactory results may be obtained by utilizing a pulsed T-R box such as illustrated in Figs. 10, 11 and 12. Such a T-R box comprises a resonant cavity connected through impedance transformers to two hollow pipe wave guides, a pair of discharge gaps and a pulsing anode. In Fig. 11 looking at the T-R box from the top are seen fragmentarily represented ends of two lengths of hollow pipe wave guide transmission lines 55a and 55b, having suitable flanges 191 and 192 for attachment to corresponding flanges 193 and 194, forming a part of the T-R box unit. One of these flanges, 193 is visible in Fig. 10. The hollow pipe wave guides 55a and 55b are assumed to be rectangular in cross-section with the longer transverse dimension shown in Fig. 11 and represented in Fig. 10 by the longer sides 195 of a corresponding rectangular opening in the T-R box unit. The rectangular opening has shorter sides 196 corresponding to the smaller dimension of the rectangular wave guides 55a and 55b. The opening 195—196 seen in Fig. 10 fits a substantially identical opening in the flange 191 of the wave guide 55a. A similar opening at the opposite side of the T-R box unit fits an opening in the flange 192 of the wave guide 55b.

As illustrated in Fig. 11 the space 197 leading from the opening 195—196 is rectangular in boundaries as far as an imaginary plane 198. Toward the center of the T-R box unit from the plane 198, the size of the channel tapers sharply to a throat or constriction, the vertical edges of which are represented in Fig. 10 by the lines 199 and 201, and in Fig. 11 by points 199 and 201. Two shoulders 200 are left at the plane 197.

The T-R box unit comprises a split casting consisting of parts 203 and 204, which are so shaped as to form not only the opening 197, but also a cylindrical cavity 205, the vertical sides of which are formed by the inner cylindrical surfaces 206 and 207 of the castings 203 and 204. To form the top and bottom surfaces of the cylindrical cavity 205 a pair of formed discs 208 and 209 is provided, these being shown in enlarged form in Fig. 12. The edges of the discs 208 and 209 fit above and below suitable shoulders in the castings 203 and 204.

The cylindrical chamber 205 bounded by the cylinder surfaces 206 and 207 and the disc surfaces 208 and 209 serves as an electrical resonant cavity which would normally permit transmission of microwave energy from the wave guide section 55a to the wave guide section 55b, through the constriction represented by its edges 199—201 opposite the hollow wave guide 55a and the corresponding constriction opposite the guide 55b. The constrictions serve as impedance transformers for matching the wave guides to the resonant cavity. For tuning the cavity threaded cylinders 211 may be provided, adjustment of which changes the actual volume of the resonant cavity by changing the volume of spaces communicating with the resonant cavity. This feature need not be described in detail since it does not constitute a part of my invention.

When electric wave energy is resonating within the resonant cavity 205, oscillatory electric potential difference is produced between the upper and lower discs 208 and 209. For producing a short circuit and preventing the transmission of radiant energy from one wave guide 55a to the other 55b, spark gap points 212 and 213 are formed in the disc elements 208 and 209. Preferably the gap formed by the points 212 and 213 is immersed in an ionizable medium such as an inert gas of the type such as neon. A partly evacuated tube 214 is provided, in which the air has been replaced by an ionizable medium such as neon at a relatively low pressure, such that the potential difference between the gap points 212 and 213, produced by the energy received from the transmitter 21 (Fig. 3) will not be sufficient to break down the gap.

For causing the gap to break down when desired, an igniting electrode or striker anode 215 is provided, and an opening 216 is formed in the point 212 with the striker anode 215 passing within close proximity through the center of the opening 216. To permit equalization of the gas pressure within the tube 214, an opening 217 may be provided in the disc element 209 also. It will be understood that the tube 214 may comprise glass sections suitably fused to metallic discs 208 and 209.

The igniter anode 215 is electrically connected to a source of control voltage as by a conductor 64, shown in Figure 3, to which pulses of suitable amplitude are supplied when it is desired to discharge the gap between the gap points 212 and 213. It will be understood that the potential difference between the anode 215 and the gap point 212 ionizes the gas therebetween, or actually initiates a discharge between these two points causing the entire space between the gaps 212 and 213 to break down when voltage is applied to the igniter anode 215.

In the arrangement represented by Figs. 3 and 1, separate delay lines 31 and 67 are provided for double-pulsing the transmitter and for delaying the received signals corresponding to the first transmitter pulse. The delay lines 31 and 67 are substantially matched in order to cause received signals to coincide in the coincidence selector.

The operation of the apparatus of Fig. 3 has been described assuming the utilization of a double-pulsed transmitter and a receiver responsive to all pulses with a suitable delay-line-controlled selector circuit following the intermediate frequency stages of the receiver. However, my invention is not limited to the arrangement in which pulses are transmitted at two different angles and received in a given beam angle, instead of the converse arrangement in which pulses are transmitted in pairs over a single beam with the second pulse of each pair delayed a fixed amount, and reflections are received over two different beams by a receiver with a suitable selector with means such as a delay line for facilitating comparison of input on the two beams.

For conveniently assuring exactness of the matching of the delay between transmitted pulses and the delay between the signals introduced in the selector circuit, a single delay line 221 may be employed for controlling both the transmitter and the selector. Such a modified circuit is shown fragmentarily in Fig. 5. The circuit elements shown in Fig. 5 between the input terminal 37 and the outlet connection 45 may be substituted for the elements shown in Fig. 3 between the terminal 37 and the connection 45, and the circuit elements shown in Fig. 5 between the input terminal 222 and the output connection 223 may be substituted for the portion of the circuit of Fig. 1 shown between the second detector output terminal 222 and the video amplifier input connection 223.

The delay controlling circuit of Fig. 5 comprises a pair of cathode follower isolation stages shown as triode vacuum tubes 224 and 225, a pair of transmitter trigger mixer stages shown as triode vacuum tubes 226 and 227, a pair of coincidence selector stages shown as pentode vacuum tubes 228 and 229, and a pair of polarity selectors shown as diode vacuum tubes 231 and 232, in addition to the delay line 221 and couplings and connections between the various elements.

One of the mixer tubes 226 is directly coupled through a connection 233 to the trigger input terminal 37, whereas the second mixer tube 227 is coupled through the isolation cathode follower 224, the delay line 221, and the polarity selector 231.

One of the coincidence selector addition tubes 229 is directly coupled to the video input signal terminal 222 through a connection 234. The other coincidence selector tube 228 is coupled to the input terminal 222 through the isolation cathode follower 225, the delay line 221, and the polarity selector 232. It will be understood that the tubes 226 to 229 may employ conventional capacity resistance input coupling to their control grids as in conventional circuits.

When a trigger pulse 38 is applied to the trigger input terminal 37, the trigger pulse is passed through the isolation amplifier 224 as a substantially duplicate pulse 38' which is applied to the left-hand input terminal 235 of the delay line 221. It appears at an end terminal 236 of the delay line 221 as a delayed spike 237.

It will be understood that in this case the delay line 221 is so arranged as to avoid reflection and to this end is effectively terminated in its characteristic impedance. This may be accomplished by coupling a load resistor 238 to the end of a line through coupling condenser 239. The resistance of the resistor 238 is so chosen in relation to the loading by the currents passed through the rectifiers 231 and 232 as to terminate the line 221 properly.

The two negative pulses 163 and 164, i. e., the video signals obtained from the output terminal 222 of the second detector 125 (Fig. 1) are passed through the isolation cathode follower 225 as pulses 163' and 164'. These two pulses are likewise delayed in passing through the delay line 221. They are represented at the end terminal 236 of delay line 221 as delayed negative pulses 241 and 242.

The polarity selectors 231 and 232 are so poled that only the positive pulse 237 passes through the selector 231, and only the two negative pulses 241 and 242 pass through the selector 232. The positive pulse 237 is inverted by the mixer amplifier 227 and is combined with the inverted underlayed trigger 38 which is supplied directly to the mixer amplifier 226. Thus, two negative pulses 46', 48' appear at the output terminal 243 at the mixer 226—227, the first pulse corresponding to the trigger 38 and the second pulse corresponding to the delayed pulse 237. The trigger pulses 46' and 48' may be applied directly to a suitable control circuit in the transmitter 21 of Fig. 3, which in this case is designed to respond to negative pulses; but, if desired, an inverter 244 may be added for the purpose of inverting the pulses 46' and 48' to produce two corresponding positive pulses 46 and 48. This permits substitution of the arrangement of Fig. 5 for a portion of the arrangement of Fig. 3 without changing the design of the transmitter 21 of Fig. 3.

As explained in connection with the operation of the addition tubes 133 and 134 shown in Fig. 1, the addition tubes 228 and 229 of Fig. 5 sum up the delayed pulses 241 and 242 applied through the delay circuit 221 to the input of the tube 228, and the undelayed pulses 163 and 164 applied to the input circuit of the addition tube 229. The delay between the pulses 163 and 164 is produced by constants of the delay line 221 because these pulses are reflections of transmitted pulses triggered by the pulses 46, 48, the delay between which is determined by the constants of the delay line 221 as previously explained. Furthermore, the time interval by which the pulses 163 and 164 are each delayed to produce the pulses 241 and 242 is also determined by the constants of the delay line 221, and the second pulse 164 therefore occurs at the same instant as the first pulse 241. At the output terminal 245 of the addition tubes 228 and 229, therefore, the sum of the coinciding pulses 164 and 241 appears as a single strong pulse 246 flanked by two weaker pulses 247 and 248. As explained in connection with addition tubes 133 and 134 of Fig. 1, if the tubes 228 and 229 are biased for non-linear operation, the flanking pulses 247 and 248 may be so small in relation to the main pulse 246 as to be negligible. Whether the tubes 228 and 229 are operated in a non-linear or linear manner, the video amplifier 154 or the indicator 155 (Fig. 1) may be so adjusted as to respond only to pulses above a predetermined value so that only the pulse 246 has any effect on the indicator 155.

As explained in connection with the pulsed T-R boxes 62 and 63, the characteristics of these boxes are such that a finite interval of time is required for them to become pulsed. It may be desirable to delay the operation of the transmitter 21 slightly with respect to the pulsing of the T-R boxes 62 and 63 by the narrow gates supplied by the connection 64 and 65. In the arrangement of Fig. 3 this was accomplished by connecting the transmitter trigger connection 45 to a delay line terminal 66. In the arrangement of Fig. 5 the requisite delay may be accomplished by interposing a short delay line 251 between the trigger terminal 37 and the input to the cathode follower isolation tube 224.

If desired, the more highly selective features of the comparator circuit 122 of the arrangement of Fig. 1 may be obtained even when a common delay line 221 is employed as in Fig. 5. To accomplish such action, the portion of the circuit of Fig. 5 between the input terminal 37 and the output connection 45 may be substituted for the portion of the circuit of Fig. 3 between input terminal 37 and output connection 45 as previously suggested. However, the portion of the circuit of Fig. 5 between the input terminal 222 and the output connection 223 would be substituted for the portion of the circuit of Fig. 1 between the second detector output terminal 222 and the addition circuit output connection 252 following the tubes 133 and 134. In other words, part of the coincidence circuit 121 of Fig. 1 between the terminals 222 and 252 is replaced by the receiving section of the transmitting and receiving pulse delay matching circuit of Fig. 5 when the highly selective features of the total circuit in Fig. 1 is desired. This, of course, implies that the proper connections must be made between the comparison circuit 122 and circuit of Fig. 5 so that the control tube 152 will function as it does in Fig. 1. It will be apparent that in this case the automatic volume control circuit 136 may also be employed for maintaining substantial constancy of the input to the video amplifier 154.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. In an object-detecting system, means for emitting radiant energy in two beams at an angle to each other, means for receiving radiant energy in a single beam, a transmitter with two output lines, one for transmitting in one beam and the other for transmitting in the other beam, means for double-pulsing the transmitter with paired pulses each of substantially equal duration and alternately closing one transmitter output line or the other so that each transmitted pulse is radiated over only one of the two available radiation beams, a radio receiver responsive to the receiving means, and a selector responsive to the radio receiver for comparing the first received signal with a delayed signal.

2. A radio object-detecting system comprising, in combination, means for successively transmitting paired pulses of substantially equal duration, successive pairs being separated by a time longer than said duration at two slightly different angles, means for receiving video signals corresponding to reflections from the two pulses, and means for comparing the magnitudes of the video signals.

3. In a radio object-detector system having a transmitter, means for double-pulsing said transmitter with paired pulses of substantially equal duration each pair being separated by a time longer than said duration, a receiver with a selector with two paths for passing video signals corresponding to reflections from transmitted pulses, a delay line common to said transmitter and receiver for predetermining the time between pulses of each pair delivered by the transmitter and the time between reflected signals of each pair passed through the two paths of the selector.

4. In an object detector system, a transmitter, means for pulsing said transmitter with groups of two time spaced pulses, a pivotally mounted radiator coupled to the transmitter, means including energy sources synchronized with the respective pulses for motivating said radiator whereby each pulse of said groups will be emitted at different angles, a receiver responsive to reflections of transmitted energy and a selector with means therein for comparing a first reflection of a group with a delayed reflection of the same group, said selector being operated by said receiver.

5. An object detector comprising, in combination, a pivotally mounted radiator, a radio transmitter coupled thereto, modulating means for pulsing said transmitter with pulse groups, each group being separated by a time longer than the time separation between the individual pulses, a radio receiver also coupled to the radiator, and a selector responsive to said receiver including a comparison circuit and signal addition means, said selector having two input paths and a delay device in one of said paths operated by the receiver and compensating for the time interval between emission of pulses in each pair, said signal addition means feeding into part of said comparison circuit.

6. An object detector comprising, in combination, a pivotally mounted radiator, a trigger circuit including a delay device for generating time spaced pulses in groups of two, a radio transmitter responsive to each of said pulses, said transmitter being coupled to said radiator, a radio receiver also coupled to the radiator, and a selector responsive to the receiver and including a coincidence circuit with two input paths connected to said receiver and a delay device in one of said paths arranged to delay the first pulse of each group for the time interval between the emission of transmitted pulses in each group, said selector further containing a second delay device to compensate for the possible difference in current lag in the coincidence circuit and the remainder of the selector.

7. An object detector system comprising, in combination, means for transmitting radiant beam energy, means for receiving reflections of radiant beam energy corresponding to the transmitted energy, both means including antenna means and one of said means having a single beam antenna pattern of radiant energy, means for double-pulsing said transmitting means to produce paired discrete pulses of radiant energy, said double-pulsing means including delay means for determining the delay between the transmitted pulses of each pair, a receiver responsive to the receiving means, and a selector responsive to the receiver, said selector including a comparison circuit and a coincidence circuit with two input paths from the radio receiver, one of said paths including delay means for producing a signal time delay corresponding to the delay between transmitted pulses of each pair.

8. In a radio object detector system, the combination of beam radiating means and beam receiving means, one of which has a single lobe characteristic and the other of which has a characteristic with two separate lobes at an angle one to the other, a radio transmitter supplying the radiating means, a radio receiver responsive to the receiving means, means for double-pulsing the transmitter with paired pulses of substantially equal duration, each pair being separated by a time longer than said duration, a selector with two paths coupled to said receiver for passing video signals corresponding to reflections from transmitted pulses, and a delay line common to said transmitter and receiver for determining the time between transmitted pulses of each pair and the time between reflected signals of each pair of signals passed through the two paths of the selector.

9. In a radio object detector system, the combination of beam radiating means and beam receiving means, one of which operates with a single lobe energy distribution pattern and the other of which operates with a distribution pattern having two separate lobes at an angle to each other, a radio transmitter supplying the radiating means, means for pulsing the transmitter with groups of two time spaced pulses, said pulses being of substantially equal duration and separated in time by an interval short in comparison to the interval between said pairs of pulses, and a selector including comparator means responsive to the radio receiver for comparing the amplitude of an initial reflected pulse with the amplitude of a delayed pulse.

10. In an object-detecting system, means for emitting radiant energy in two beams at an angle to each other, means for receiving radiant energy in a single beam, a transmitter with two output lines, one for transmitting in one beam and the other for transmitting in the other beam, means for double-pulsing the transmitter with paired pulses of substantially equal duration, each pair being separated by a time longer than said duration and switching means responsive to said pulses alternately disabling said transmitter output lines so that each transmitted pulse is radiated over only one of the two available radiation beams, a receiver responsive to the receiving means, and a selector including addition amplifiers with two input paths and a delay device in one of said paths operated by the receiver for comparing the amplitude of a first received signal with the amplitude of a delayed transmitted pulse.

11. In an object-detecting system, means for emitting radiant energy in two beams at an angle to each other, means for receiving radiant energy in a single beam, a transmitter with two output lines, one for transmitting in one beam and the other for transmitting in the other beam, means for double-pulsing the transmitter with paired pulses of substantially equal duration, each pair being separated by a time longer than said duration, switching means responsive to said pulses alternately closing one transmitter output line or the other so that each transmitted pulse is radiated over only one of the two available radiation beams, a receiver responsive to the receiving means, a selector with two paths for passing video signals corresponding to reflections from transmitted pulses, and a delay line common to said transmitter and receiver for predetermining the time between transmitted pulses of each pair and the time between reflected signals of each pair passed through the two paths of the selector.

12. In a radio object detector system having a transmitter, means for double-pulsing said transmitter with paired pulses of substantially equal duration, each pair being separated by a time longer than said duration, a receiver for accepting pulses reflected from an object, and a transmitting and receiving pulse delay matching circuit including two paths for passing video signals corresponding to reflected pulses, one of said paths having a delay line which is common to said transmitter and receiver for predetermining the time between transmitted pulses of each pair the same as the time between reflected pulses of each pair.

13. In a radio object detector system having a transmitter, means for double-pulsing said transmitter with paired pulses of substantially equal duration, a receiver for accepting pulses reflected from an object, and a transmitting and receiving pulse delay matching circuit including two paths for passing video signals corresponding to reflected pulses, one of said paths having a delay line which is common to said transmitter and receiver for predetermining the time between transmitted pulses of each pair the same as the time between reflected pulses of each pair, and signal addition means for combining said reflected pulses as video signals for impression upon indicator means.

14. In a radio object detector system having a transmitter, means for double-pulsing said transmitter with paired pulses of substantially equal duration, each pair being separated by a time longer than said duration, a receiver for accepting pulses reflected from an object, a transmitting and receiving pulse delay matching circuit including two paths for passing video signals corresponding to reflecting pulses, one of said paths having a delay line common to said transmitter and receiver for predetermining the time between transmitted pulses of each pair the same as the time between reflected pulses of each pair, means connected to each of said paths for adding coincident pulses, a comparison circuit including a control device to pass coincident pulses representative of an equal amplitude received pulse condition, and an indicator responsive to said coincident pulses for indicating the presence of said reflecting object.

15. In a radio object detector system having a transmitter, means for causing pulses of equal duration to be produced by said transmitter in pairs with a fixed delay between pulses of a pair considerably shorter than the period between respective pairs of pulses, a receiver responsive to reflections of said transmitted pulses, a selector including at least one isolation amplifier for passing video signals corresponding to reflections from transmitted pulses, and a delay line common to said transmitter and selector for producing a definite time interval between the pulses of each pair delivered by the transmitter and a definite time interval between said received signals which are passed through one of the paths of the selector.

16. In a radio object detector system having a transmitter, means for causing pulses of equal duration to be poduced by said transmitter in pairs with a fixed delay between pulses of a pair considerably shorter than the period between respective pairs of pulses, a receiver responsive to reflections of said transmitted pulses, a selector including a comparator for comparing the amplitude of a first received signal with the amplitude of a similar delayed signal, said selector having an amplifier for passing video signals corresponding to reflections from transmitted pulses, and a delay line common to said transmitter and selector for producing a definite time interval between the pulses of each pair transmitted and a similar interval between said received signals which are passed through said amplifier.

17. An object detector system comprising, in combination, means for transmitting radiant beam energy, means for receiving reflections of radiant beam energy corresponding to the transmitted energy, both of said means including antenna means and one of said antenna means having a single lobe pattern of radiant energy, means for double-pulsing said transmitting means to produce paired pulses of radiant energy, said double-pulsing means including delay means for determining the delay between the transmitted pulses of each pair, a radio receiver responsive to the receiving means, and a selector responsive to the radio receiver, said selector including a comparison circuit with two input paths from the radio receiver.

18. In an echo type radio pulse system, means for identifying energy reflected from an object comprising a transmitter for radiating energy periodically modulated by pairs of short time separated pulses to irradiate said object, a receiver for receiving energy reflected from said irradiated object, means responsive to energy having the requisite modulation for segregating such energy from other received energy, and a comparison circuit with a control device only discharging in accordance with a condition representing equal plus reflections in each pair.

19. In an echo type radio pulse system, means for identifying energy reflected from an object comprising a transmitter for radiating energy periodically modulated by a duality of short pulses to irradiate said object, a receiver for receiving energy reflected from said irradiated object, means responsive to energy having the requisite modulation for segregating such energy from other received energy, a comparison circuit with a control device only discharging in accordance with a condition representing equal pulse reflections in each pair, and means responsive to said segregated energy for controlling said receiver to maintain the average level of said segregated energy substantially constant.

20. In an echo type radio pulse system, means for identifying energy reflected from an object comprising a pulse generator for producing a certain frequency, a transmitter including a delay device for radiating energy to irradiate said object, said energy being modulated by groups of pulses periodically in accordance with the frequency of said generator, a receiver for receiving energy reflected from said irradiated object, means including said delay device responsive to energy having the requisite modulation for segregating such energy from other received energy, a comparison circuit with a control device discharging only in accordance with a condition representing equal pulse reflections in each group, and means responsive to said receiver to maintain the average level of said segregated energy substantially constant.

21. In an echo type radio pulse system, means for identifying energy reflected from an object comprising a transmitter including delaying means for radiating energy periodically modulated by a plurality of short pulses to irradiate said object, a receiver for receiving energy reflected from said irradiated object, means including said delaying means responsive to energy having the requisite modulation for segregating such energy from other received energy, and means responsive to said segregated energy for controlling said receiver to maintain the average level of said segregated energy substantially constant.

22. In an echo type radio pulse system, means for identifying energy reflected from an object comprising transmitter means including delaying means for producing successive groups of a plurality of energy pulses to irradiate said object, the time spacing between the pulses of each group being different than that between groups, a receiver for receiving energy reflected from said object, and means including said delaying means responsive to said energy pulses having the requisite time spacing therebetween so as to segregate said pulses from other received energy.

23. An object detector comprising in combination means for transmitting pulses in a plurality of discrete directions including a pivotally mounted radiator and a radio transmitter coupled thereto; a radio receiver coupled to said radiator, and a pulse selector circuit responsive to the output of said receiver including comparison and coincidence circuits, said coincidence circuit having two input paths connected to said receiver and a delay device in one of said paths to thereby match the intensities of the reflected pulses received from said discrete directions.

24. An object detector system comprising in combination means for transmitting radiant beam energy including antenna means, means for receiving reflections of said radiant beam energy including antenna means, at least one of said antenna means having a plural lobe antenna pattern, means for generating pairs of time spaced pulses of substantially equal duration each pair being separated by a time longer than said duration, delay means for determining the delay between the transmitter pulses, and a selector responsive to said radiant energy receiving means, said selector including a comparison circuit with two input paths connected to said radio receiving means one of said paths including second delay means to produce a delay equal to the delay between received pulses of each pair.

25. In a radio object detector system the combination of beam radiating means and beam receiving means, one of which has a single lobe characteristic and the other of which has a characteristic of two separate lobes at an angle one to the other, a radio transmitter supplying the radiator means, a radio receiver responsive to the receiving means, means for modulating said transmitter with time spaced pulse groups, and a selector responsive to said radio receiver including at least one isolation amplifier and a comparison circuit to thereby compare the initial reflected pulse with a delayed reflected pulse of said pulse groups.

26. A radio object detecting system comprising in combination a transmitter, means for causing pulses of equal duration to be produced by said transmitter in pairs with a delay between pulses of a pair considerably shorter than the period between respective pairs of pulses, a receiver responsive to reflections of transmitted pulses, comparison circuits responsive to the receiver for comparing successive reflections, and directional antenna means arranged to be alternately switched to said transmitter and said receiver and also arranged to have a plural lobe antenna pattern and a single lobe antenna pattern alternately in syschronism with said switching.

27. A radio object detecting system, comprising in combination, a transmitter including means for creating groups of two pulses, said pulses being of substantially equal duration separated for a time considerably longer than said duration, a radar receiver, a selector including delay means and an intensity comparison circuit for comparing successive received echo signals, and antenna means for rendering the relative magnitudes of the received signals of each pair of received signals dependent upon angular position of an object intercepting the radiation from the transmitter.

28. In a radiant energy object detector, means for transmitting and means for receiving time-spaced signals, a pair of antenna means having overlapping directivity patterns connected to said receiving means, and selector means coupled to said receiver means and said antenna means comprising signal delaying means responsive to said time spacing and arranged to thereby select reflected signals received from the direction of said overlapping patterns.

29. In a radiant energy object detector, means for transmitting and means for receiving signals in a plurality of diverging directions including directional antenna means, and selector means coupled to said receiver means and said antenna means comprising signal delaying means arranged to select reflected signals received from the median direction of said diverging directions.

30. In a radiant energy object detector, means for transmitting and means for receiving signals in two divergent directions including directional antenna means, and selector means coupled to said receiver means and said antenna means comprising coincidence signal means arranged to select reflected signals received from the direction bisecting the two diverging directions.

31. In a radiant energy object detector, means for transmitting and means for receiving signals in a plurality of diverging directions including directional antenna means, and selector means coupled to said receiver means and said antenna means comprising signal delaying means and coincidence signal means responsive to said signal delaying means and to said receiver to thereby select reflected signals received from the median direction of said diverging directions.

32. In an object detector, transmitting and receiving means for obtaining reflected radiant energy pulses in a plurality of directions including directional antenna means connected to said transmitting and receiving means, and pulse selecting means responsive to said receiving means and said antenna means to select received pulse reflections only when said antenna means is pointed accurately at the target causing said pulse reflections.

References Cited in the file of this patent
UNITED STATES PATENTS 1,035,958    Giradeau    Aug. 20, 1912

(Other references on following page)

UNITED STATES PATENTS

| | | |
|---|---|---|
| 2,039,812 | Leib et al. | May 5, 1936 |
| 2,118,626 | Smith | May 24, 1938 |
| 2,128,234 | Dallenbach | Aug. 30, 1938 |
| 2,176,469 | Moueix | Oct. 17, 1939 |
| 2,189,549 | Hershberger | Feb. 6, 1940 |
| 2,200,009 | Nuttall | May 7, 1940 |
| 2,283,054 | Gossel | May 12, 1942 |
| 2,403,600 | Holmes | July 9, 1946 |
| 2,410,233 | Percival | Oct. 29, 1946 |
| 2,419,525 | Alford | Apr. 29, 1947 |
| 2,424,984 | Hoffman | Aug. 5, 1947 |
| 2,455,673 | Hansell | Dec. 7, 1948 |
| 2,509,207 | Busignies | May 30, 1950 |

FOREIGN PATENTS

| | | |
|---|---|---|
| 497,147 | Great Britain | Dec. 9, 1938 |